United States Patent

Bull

[11] Patent Number: 5,970,468
[45] Date of Patent: Oct. 19, 1999

[54] METHOD AND SYSTEM FOR COMMUNICATING BETWEEN USERS OF A PRODUCTIVITY TRACKING SYSTEM

[75] Inventor: Jeffrey A. Bull, Nampa, Id.

[73] Assignee: Micron Electronics, Inc., Nampa, Id.

[21] Appl. No.: 08/964,937

[22] Filed: Nov. 5, 1997

[51] Int. Cl.[6] .............................. G06F 15/00; G06F 17/30
[52] U.S. Cl. ................................... 705/11; 705/32; 705/1; 395/200.57; 395/200.33; 395/200.34; 395/200.36
[58] Field of Search ................................... 705/11, 32, 1; 364/143; 368/10; 395/200.57, 200.33, 200.34, 200.36, 200.47

[56] References Cited

U.S. PATENT DOCUMENTS

| | | | |
|---|---|---|---|
| 4,819,162 | 4/1989 | Webb, Jr. et al. | 705/32 |
| 5,068,787 | 11/1991 | Pipella et al. | 705/32 |
| 5,508,977 | 4/1996 | Tymn | 368/10 |
| 5,646,839 | 7/1997 | Katz | 379/93.01 |
| 5,696,702 | 12/1997 | Skinner et al. | 702/186 |
| 5,764,916 | 6/1998 | Busey et al. | 395/200.57 |
| 5,842,181 | 11/1998 | Fanjoy | 705/32 |

OTHER PUBLICATIONS

ICQ Web site (http://www.icq.com/support/) Guided Tour—Product's Features, Dec. 1998.

*Primary Examiner*—Allen R. MacDonald
*Assistant Examiner*—Penny Caudle
*Attorney, Agent, or Firm*—Seed and Berry LLP

[57] ABSTRACT

A method and system for facilitating communications between technical support specialists in a call center environment. Under control of a first computer, the system displays on a display device a form for tracking time of a technical support specialist. The system then receives a request to communicate with a second technical support specialist and sends to an internet protocol address of the second computer request to communicate with the first technical support specialist. At the second computer system, the system displays on a second display device a form for tracking time of the second technical support specialist. In response to receiving a request sent by the first computer system, the second system displays on the second display device a window informing the second technical support specialist that the first technical support specialist has requested to communicate. In response to receiving an approval from the second technical support specialist to communicate with the first technical support specialist, the second system sends a notification of the received approval to the internet protocol address of the first computer. The first technical support specialist can then communicate with the second technical support specialist by inputting data to the first computer which is transmitted for display on the second computer, and the second technical support specialist communicates with the first technical support specialist by inputting data to the second computer which is transmitted for display on the first display device.

25 Claims, 8 Drawing Sheets

TOOL TALK PLUG-IN MODULE

METHOD AND SYSTEM FOR COMMUNICATING BETWEEN USERS OF A PRODUCTIVITY TRACKING SYSTEM

TECHNICAL FIELD

The present invention relates generally to computer systems and, in particular, to a computer system for communicating between users.

BACKGROUND OF THE INVENTION

Various types of organizations (e.g., developers of computer programs and manufacturers of computer systems) provide telephonic customer support services. To use such customer support services, a customer places a call to a customer support center for the organization. When the call is received at the customer support center, the call is distributed to one of the available customer service representatives. Each customer service representative typically has a computer system through which the representative can access information needed to respond to a customer. These computer systems are typically personal computers that are connected through a network to a server computer system. The server computer system provides access to the information needed to respond to the customers. For example, manufacturers of personal computers typically provide technical support via telephone to their customers. When a technical support specialist of the manufacturer is routed a telephone call, the specialist assesses the needs of the customer and prepares and provides an appropriate response, such as how to repair the configuration file of the customer's computer system.

The cost of providing such a customer service center for technical support can be very high. In addition to the salaries of each of the technical support specialists, the manufacturer typically spends significant amounts on training the technical support specialists and on providing computer systems to aid the specialists in servicing the customers. Therefore, it is very important that these highly trained specialists operate as productively as possible. Unfortunately, it has been very difficult to assess the productivity of technical support specialists. In particular, technical support specialists may work on various tasks other than receiving incoming calls from customers. For example, in order to respond to a customer, the technical support specialist may need to spend some time researching the customer's problem. The specialist may need to present the customer's problem to an experienced systems programmer who can then help provide a solution to the problem. A technical support specialist may also need to discuss a customer's problem with another more experienced specialist who may have encountered that problem before. Also, the technical support specialist often needs to place a follow-up call to the customer to provide the response. In addition, technical support specialists may need to attend various meetings and classes when they would otherwise be available to receive incoming calls from customers. For example, a technical support specialist may need to attend a class on a new feature of a computer system that will soon be sold by the manufacturer.

Because the technical support specialists can spend their day performing a variety of tasks, it has been difficult to assess their productivity. Consequently, supervisors of the technical support specialists have in the past requested that each specialist provide a tracking of the time in which the technical support specialist was not available to respond to an incoming call. The technical support specialists would typically hand write a log of their time spent other than answering incoming calls and forward the log to the supervisor. The supervisor would then correlate the information in the logs and attempt to evaluate the productivity of the technical support specialist. Using such information, the supervisor can identify ways to improve the availability of specialists to receive incoming calls. For example, the supervisor may request that systems programmers provide prompt attention or that additional specialists be hired.

Unfortunately, such an informal technique for the tracking time of specialists has serious disadvantages. First, if specialists do not record their time in the logs contemporaneously with the activity, then the accuracy of the logs suffers. Second, different specialists may record different levels of detail. For example, one specialist may record that time was spent generally on research, while another specialist may record that time was spent reviewing manuals to respond to a configuration file problem, talking to a systems programmer, and placing a follow-up call to the customer. Third, because the logs are handwritten, the supervisor is likely not able to perform a meaningful analysis of the logs in a reasonable amount of time.

Even if these problems of tracking the time of the specialists can be solved, the solution does not necessarily by itself increase the productivity of the specialists. In particular, specialists may spend a considerable amount of time discussing customer problems with other specialists. Although the fact that specialists are spending considerable amounts of time discussing problems with other specialists may become apparent if the tracking problem is solved, a supervisor would still need to devise a way to reduce that amount of time.

SUMMARY OF THE INVENTION

An embodiment of the present invention provides a method and system for facilitating communications between representatives in a call center environment. The communications system comprises a productivity tracking ("PT") component and a plug-in communications ("PIC") component. The communications system is installed at each representatives' computer system. The PT component provides for data entry fields through which the representative can record productivity information that includes the start and end periods of activity and exceptions to normal activity. The PIC component controls the communication between representatives. When a representative indicates a request to communicate with another representative, the PIC component sends to the computer system of the other representative a request to communicate with the other representative. When the PIC component receives approval from the other representative to communicate, the communication proceeds between the representatives. Whenever a representative enters a message, the PIC component sends the message to the other representative. Correspondingly, when the PIC component receives a message from the other representative, it displays the message for the representative to see.

DETAILED DESCRIPTION OF THE INVENTION

Figure 1:
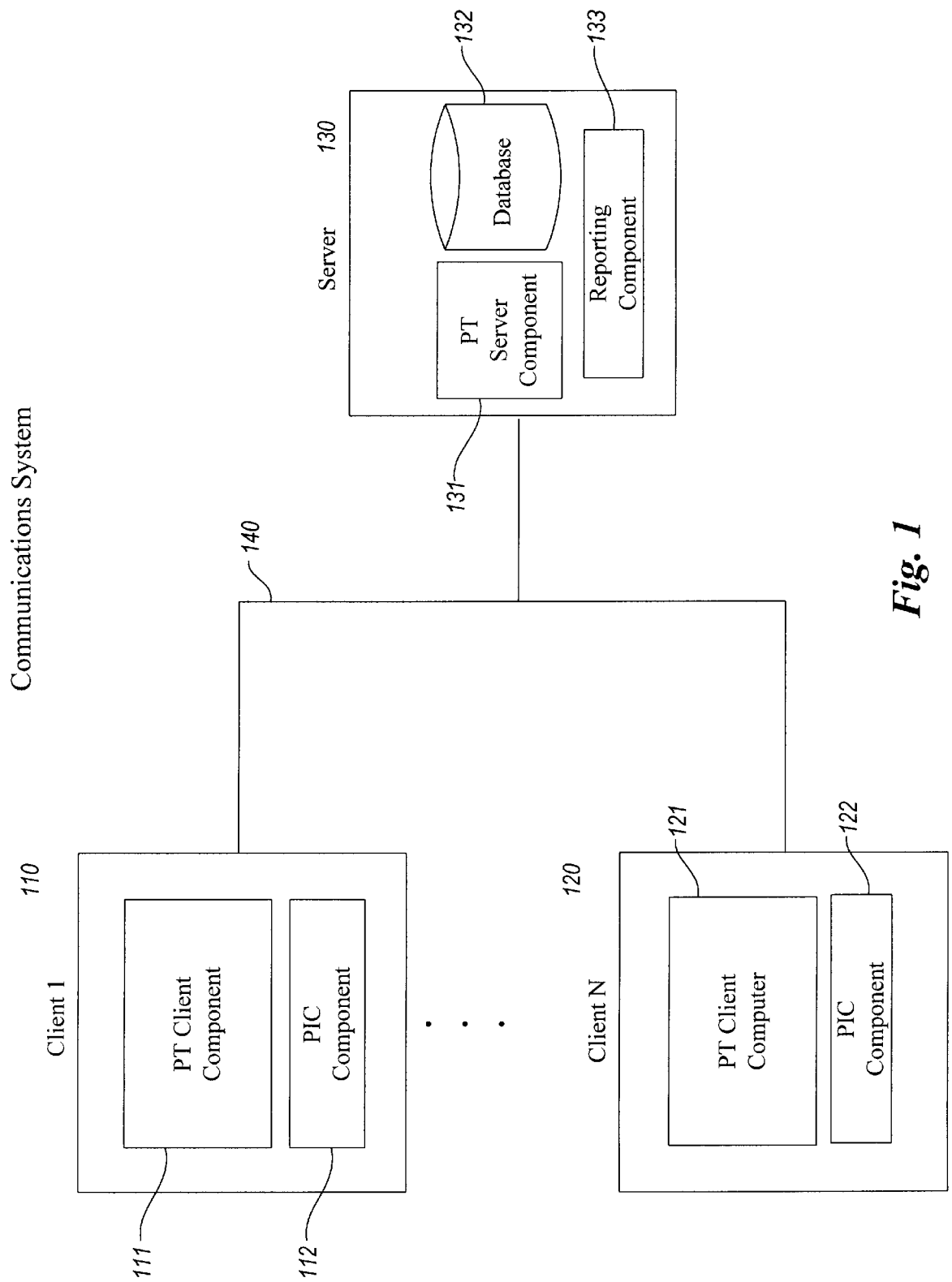
FIG. 1 is a block diagram illustrating one typical computing environment in which the PT system may operate.

An embodiment of the present invention provides a method and system for facilitating computer-based communication between technical support specialists in a call center environment. The communications system comprises a productivity tracking ("PT") component and a plug-in communications ("PIC") component. The PT component receives from a specialist productivity information that includes time spent on normal activity and indications of exception to normal activity. The PIC component allows a specialist to exchange information with other specialists in real time so that knowledge obtained by one specialist can quickly be disseminated to other specialists. The communications system supports two-way communication so that a specialist can ask questions and have their questions answered in a timely manner. Each specialist communicates using a computer system that has been assigned an internet protocol ("IP") address. The computer systems in one embodiment are interconnected via a local area network. When a specialist wishes to communicate with another specialist, the specialist first indicates to the communications system that communication is desired, for example, by selecting a communications icon. The communications system then starts the PIC component. The PIC component then prompts the specialist to identify the other specialist. The PIC component may display a list of specialists who are registered as currently using the communications system to aid in identifying the other specialists. A specialist who starts a communication is referred to as an initiator; a specialist who is requested to participate in the communication is referred to as a respondent; and the two specialists who are communicating are participants. The participant at one computer system is referred to as a "local participant," and the participant at the other computer system is referred to as a "remote participant." Once the respondent is identified, the PIC component determines the IP address of the computer system of the respondent. The PIC component then sends a request to communicate via the local area network to the addressed computer system. When the respondent's computer system receives the request, the PIC component at that computer system displays a communications window along with an indication that the initiator is requesting to communicate with the respondent. The respondent can either proceed with the communication or decline to communicate with the initiator. If the respondent declines the request to communicate, then the respondent's PIC component notifies the initiator's PIC component. The respondent's PIC component also removes the communications window. If the respondent accepts the request to communicate, then the respondent's PIC component begins transmitting the message entered into the communications window to the initiator's computer system. Also, the respondent's computer system receives messages transmitted from the initiator's PIC component and displays them within the respondent's communications window. Similarly, the initiator's PIC component transmits messages entered into the initiator's communications window to the respondent's computer system. The initiator's PIC component also receives messages transmitted from the respondent's PIC component and displays them within the initiator's communications window.

The PT component comprises a PT client component that is installed on each representatives' computer system, referred to as a client computer, and a PT server component that is installed at a server computer to which each client computer is connected. The PT client component receives productivity information from a specialist. That information includes time spent on normal activity and indications of exceptions to normal activity (i e., abnormal activity). Each indication of normal and abnormal activity includes the amount of time spent by the specialist on that activity and, for the abnormal activity, the type of the exception. When the PT client component receives productivity information from a specialist, it forwards the information to the server computer. The PT server component receives the productivity information and stores the information in a database on the server computer. To display productivity information to a specialist, the PT client component requests the server computer to provide the information. In response to the request, the PT server component retrieves the information from the database and sends the information to the requesting client computer.

The PT client component also displays an icon (or another communications selector, such as a menu item) for the PIC component. When a user selects the icon, the PT client component starts the execution of the PIC component, and the user is considered to be the initiator of a communication. The PIC component displays a list of users registered to use the communications system. The initiator can then select another user, that is, a respondent, with whom to communicate.

FIG. 1 is a block diagram illustrating one typical computing environment in which the PT system may operate. The computing environment includes client computers 110, 120 and server computer 130. The computers may be any of a variety of computers that include a central processing unit, memory, storage devices, and various I/O devices. The computer systems are connected through a local area network 140 through which the computers can exchange information. However, one skilled in the art will appreciate that the computers could be connected via various mechanisms such as a wide area network or the internet. Each client computer 110, 120 includes a PT client component 111, 121 and a PIC communications component 112, 122. The PT client component coordinates the receiving of timecard and exception information from a user and sending of the information to the server computer via local area network. The PIC component controls the displaying of the communications window and the coordinating of the communication. The server computer comprises a PT server component 131, a database 132, and a reporting component 133. The PT server component receives requests from the client computers for the storing and for the retrieving of productivity information. The PT server component stores the productivity information in the database. The reporting component provides various reports through which a user (e.g., a supervisor of a specialist) can analyze the productivity information. The PT client component and the PT server component are described in detail in U.S. application Ser. No. 08/964,943, entitled "Method and System for Tracking Employee Productivity in a Client/Server Environment," being filed concurrently and which is hereby incorporated by reference.

Figure 2:
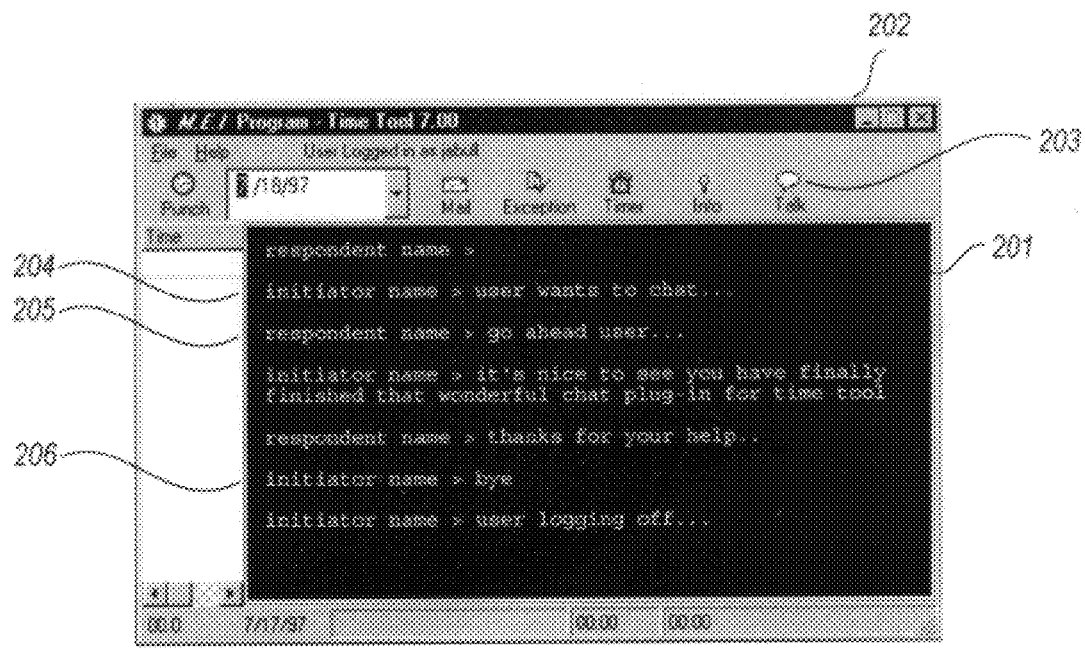
FIG. 2 illustrates one possible display of a communications window through which an initiator and respondent communicate.

FIG. 2 illustrates one possible display of a communications window through which an initiator and respondent communicate. The communications window 201 overlays a portion of a productivity window 202. The communications window is displayed at the initiator's computer system when the initiator selects a respondent. The PT client component displays the productivity window along with the icon 203 (i.e., a communications selector). When a user selects the icon, the PT client component starts the execution of the PIC component. The content of the communications window illustrates a short communications of a respondent. The respondent's PIC component sounds a warning beep and displays the communications window when it receives a request to communicate. The communications window contains an indication that identifies the initiator (i.e., "text" before the ">" symbol) and indicates that the initiator wants to start a communications 204. At that point, the respondent can indicate to proceed with the communication 205 by entering a response. Otherwise, the respondent can enter a terminate command, such as "bye", to terminate the communications. If the communication is not terminated, then the respondent can enter a message that is to be transmitted to the initiator, and the PIC component displays messages received from the initiator. Each displayed message is prefaced with the identification of the initiator or respondent as appropriate. Whenever the respondent or the initiator wishes to complete the communication, then they can terminate the communication by entering the appropriate termination command, such as "bye." When the communication is terminated, then the participant who did not terminate the communication is notified of the termination by displaying a message, and the communications windows are removed.

Figure 3A:
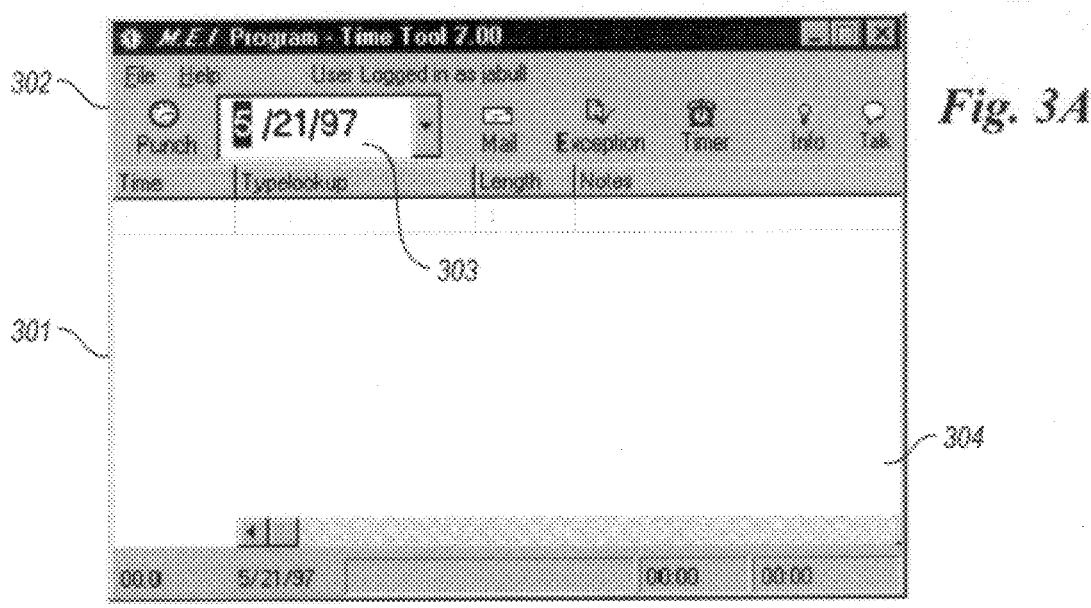
FIGS. 3A–3F illustrate one possible display of the window through which a user can enter the timecard and exception information.
Figure 3B:
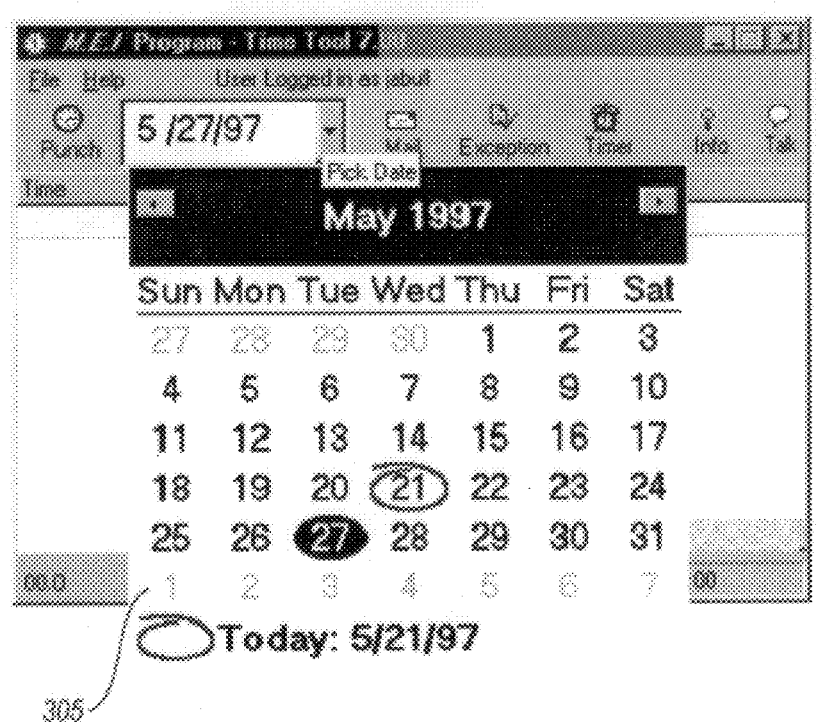

FIGS. 3A–3F illustrate one possible display of the window through which a user can enter the timecard and exception information. The PT window 301 contains various icons 302 through which the user can select various functions provided by the PT client component. The PT window is displayed when the PT client component is executed. The icons include the punch icon, the mail icon, the exception icon, the timer icon, and the talk icon. When the punch icon is selected, the PT client component sends a request to the server computer to record a timecard entry that indicates activity is either starting or ending. When the exception icon is selected, the PT client component enables a user to input an exception and then it sends a request to the server computer to record that exception. When the timer icon is selected, the PT client component allows the user to time the length of an activity. When the talk icon is selected, the PIC component initiates a communication. When the mail component is selected, the PT client component allows the user to send an electronic mail message. The date window 303 indicates the selected date. The timecard entries and exceptions for the selected date are displayed in the display area 304. As shown in FIG. 3A, no timecard entries or exceptions for the selected date (i.e., "May 21, 1997") are displayed. The display area includes four columns. The "Time" column displays the timecard entries. The "Typelookup" column displays the type of each recorded exception; the "Length" column displays the length of the exception; and the "Notes" column displays comments relating to the exception. FIG. 3B illustrates the selection of the date. When the user selects the drop-down button to the right of the selected date, the PT client component displays a calendar for the month corresponding to the selected date. The user can then use the calendar to select another date. When a date is selected, the PT client component updates the date window. The PT client component queries the server computer to determine whether the user has recorded any productivity information for the selected date. If the selected date has associated productivity information, then the PT client component displays that information in display area 304. In this example, the user selects "May 21, 1997" as the date.

Figure 3C:
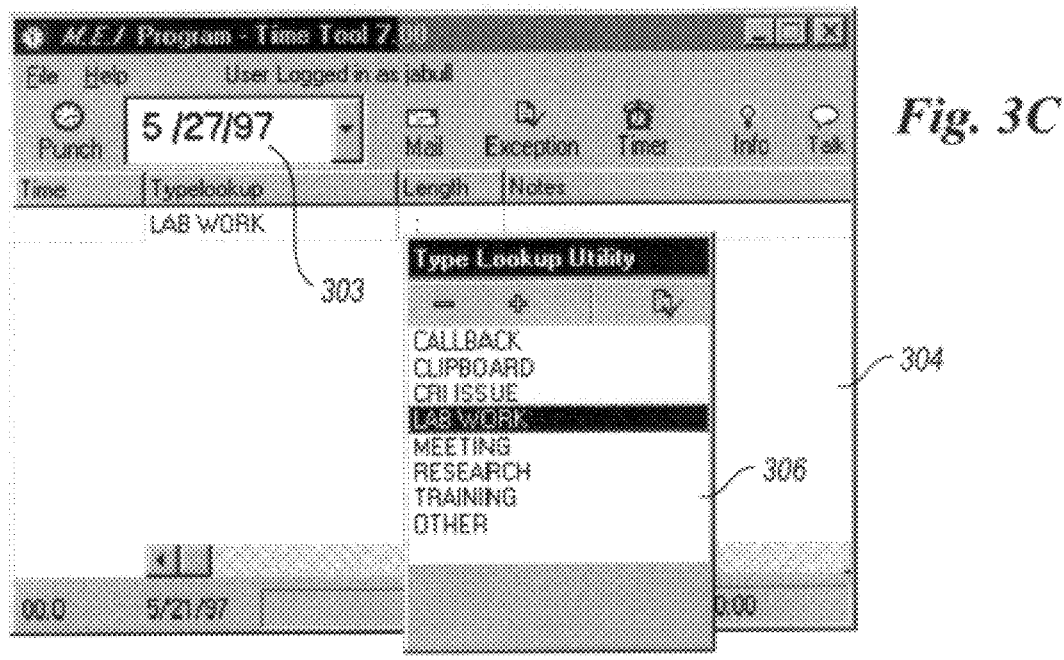
Figure 3D:
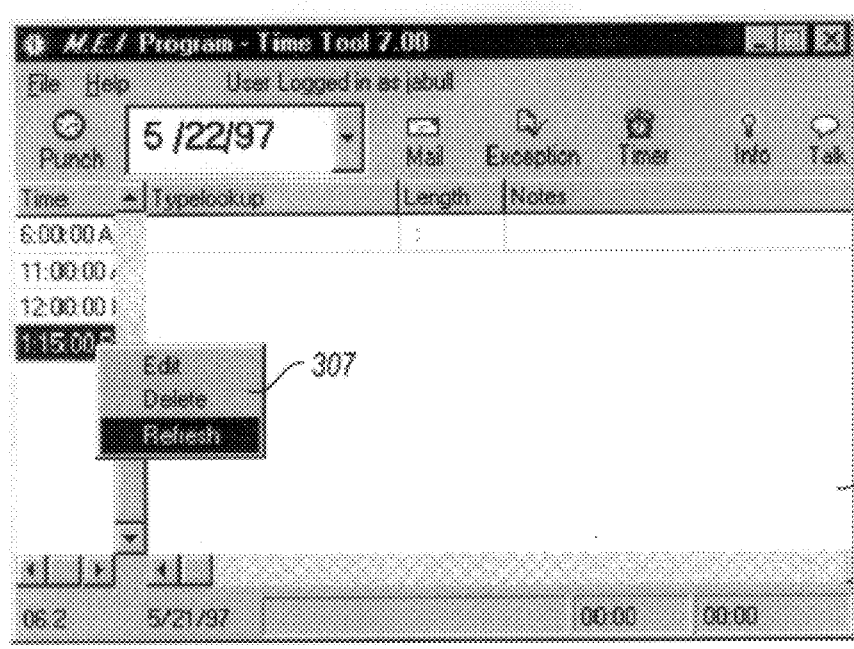
Figure 3E:
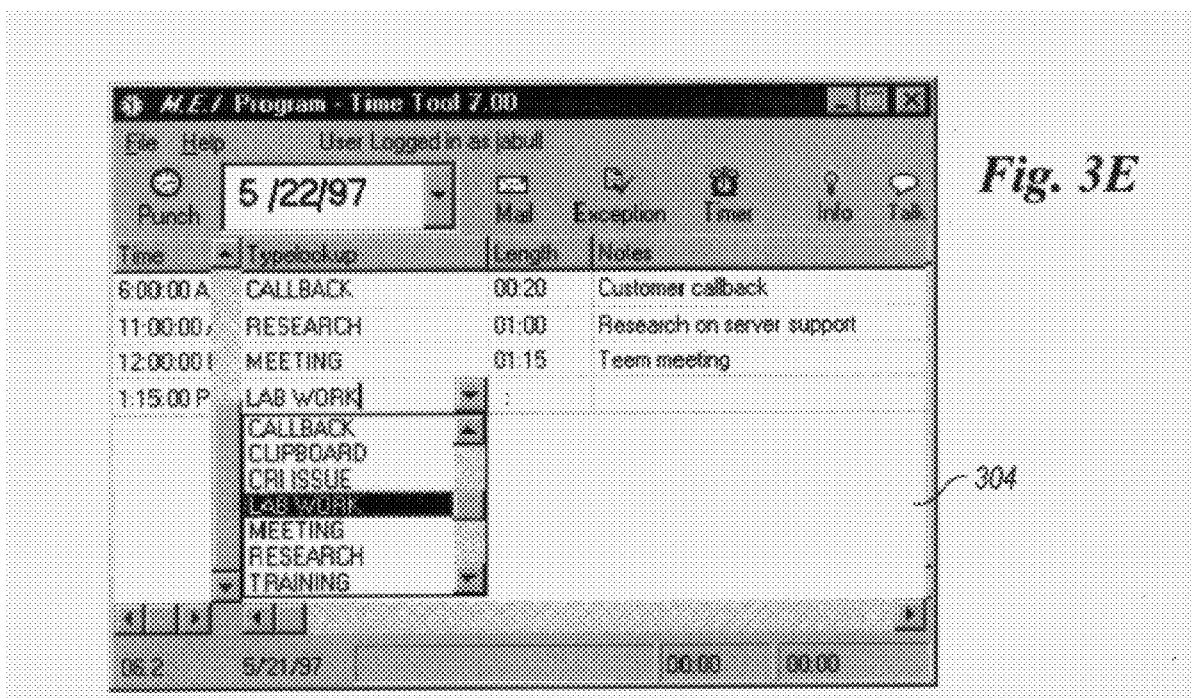
Figure 3F:
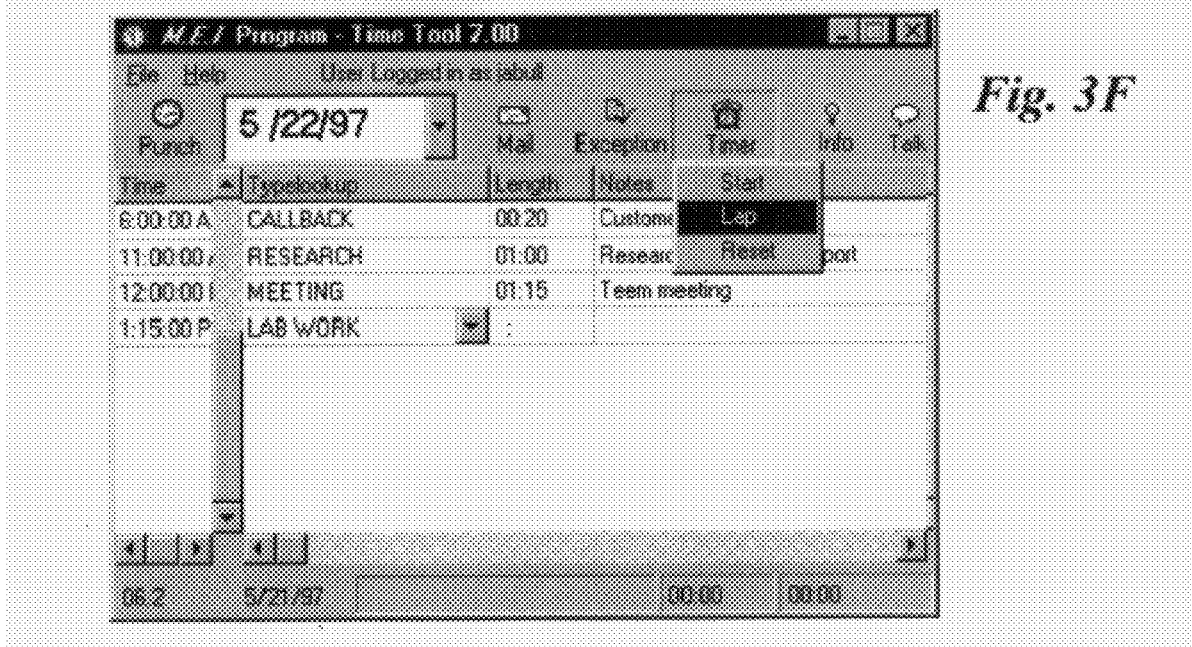

FIG. 3C illustrates one possible display of a window containing the types of exceptions and another selected date. The selected date is shown in the date window 303. When a user selects the exception icon, the window 306 of exception types is displayed. The user can then select the appropriate exception type which is displayed in display area 304 in the Typelookup column. The use of this window of exception types helps ensure a uniform level of detail of the information entered by multiple users. FIG. 3D illustrates the functions of the Time column. The Time column contains the times in which the user either started (i.e., "punched in") or ended (i.e., "punched out") an activity. The PT client component also allows the user to modify the Time column as indicated by the pop-up window 307. The Time column indicates that the user started activity at 6:00 a.m., stopped activity at 11:00 a.m., restarted activity at 12:00 p.m., and ended that activity at 1:15 p.m. FIG. 3E illustrates the contents of display area 304 after the user has entered several exceptions and punched various times. FIG. 3F illustrates the use of the timer icon. The current running timer is displayed at the bottom of the window area.

In one embodiment, each computer system that is currently executing the communications system maintains a list of each user who is currently using the communications system. In this way, the PIC component can display a list of only those users who are currently using the communications system to an initiator. Thus, the initiator selects from a list of those users who can currently communicate. Whenever execution of the communications system is started by a user, the communications system sends a message identifying the user and the starting to each other computer system that is executing the communications system. Also, whenever execution of the communications system is stopped by a user, the communications system sends a message identifying the user and the stopping to each other computer system that is executing the communications system. Each executing communications system updates its list as users start and stop the communications system. Also, each executing communications system can periodically send messages identifying the user. In this way, a communications system that first starts can quickly identify the other users. Alternatively, the server computer could maintain a central list of users and send the list to each communications system when it first starts executing.

Figure 4:
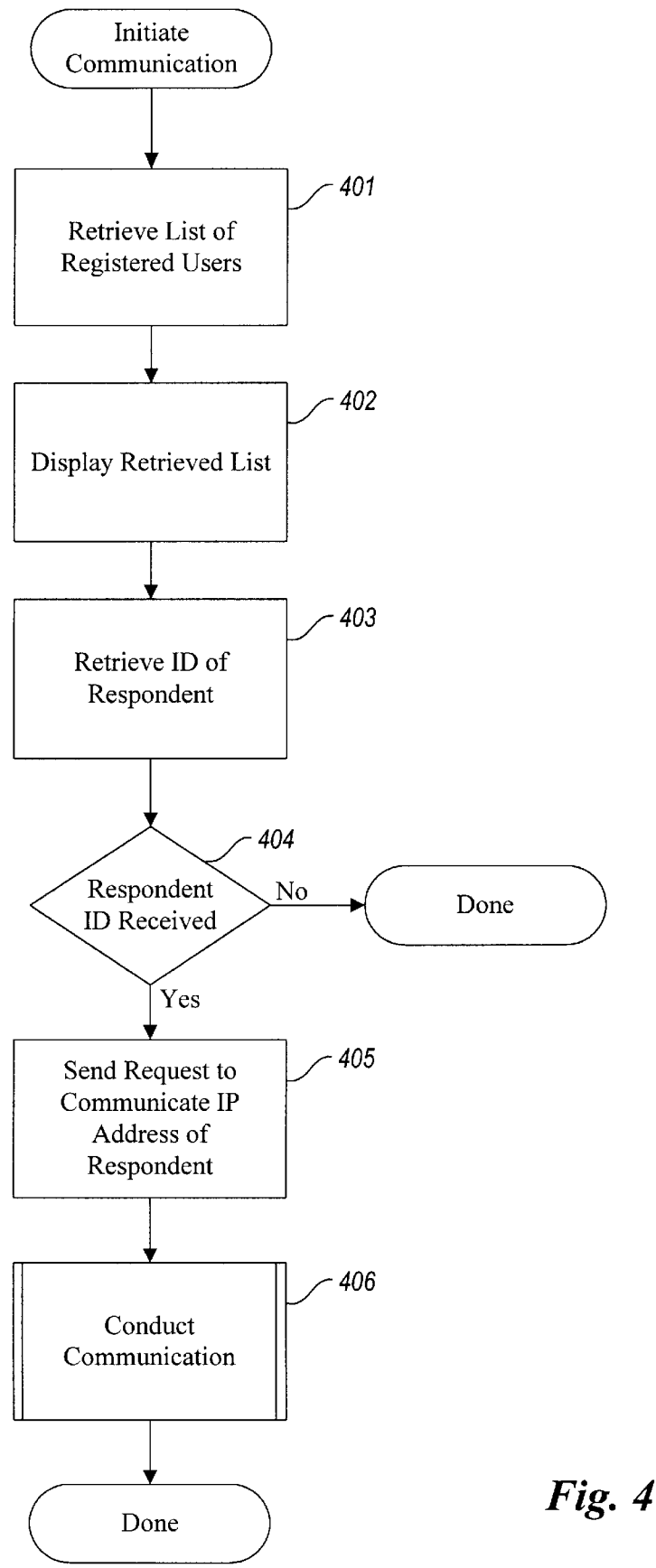
FIG. 4 is an exemplary flow diagram illustrating a procedure to initiate communication.

FIG. 4 is an exemplary flow diagram illustrating a procedure to initiate communication. This procedure is part of the PIC component and is invoked by the PT component when an initiator selects the communications icon. This procedure controls the initiation of a communication by an initiator and conducts the communication. In step 401, the procedure retrieves a list of users that are registered to use the communications system. Each registered user has an associated IP address that is maintained in an address table. In step 402, the procedure displays the retrieved list as a drop-down list. In step 403, the procedure receives the identification of the respondent selected by the initiator from the drop-down list. In step 404, if the identification of a respondent is received, then the procedure continues at step 405, else after a predefined time period the procedure terminates and returns to the PT component. In step 405, the procedure retrieves the IP address of the respondent from the address table and transmits a request to communicate to that IP address. Alternatively, the initiator can input the IP address directly, rather than the identification of the respondent. In step 406, the procedure then invokes a routine to conduct the communication.

Figure 5:
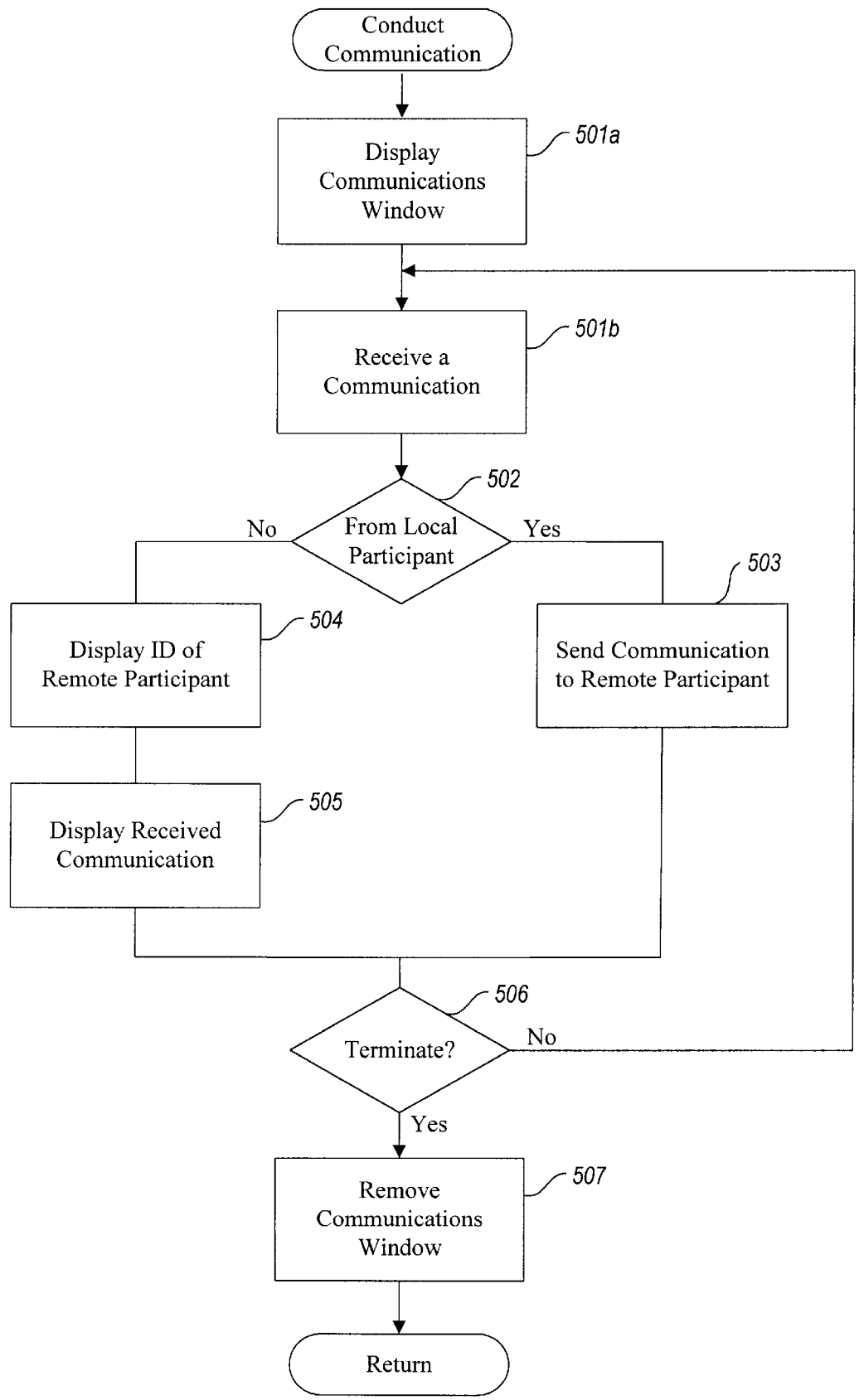
FIG. 5 is an exemplary flow diagram of the routine to conduct a communication.

FIG. 5 is an exemplary flow diagram of the routine to conduct a communication. This routine controls the communication of both the initiator and respondent. This routine displays the communications window, receives messages from the local participant and transmits them to the remote participant, and receives messages from the remote participant and displays them within the communications window. The local participant is the user (i.e., initiator or respondent) who is currently interacting with the executing PIC component at the local computer system. In step 501a, the routine displays the communications window. In step 501b, the routine receives a message from either the remote participant of the communication or from the local participant. In step 502, if the message is received from the local participant, then the routine continues at step 503, else the routine continues at step 504. In step 503, the routine transmits the message received from the local participant to the remote participant and continues at step 506. In step 504, the routine displays the identification of the remote participant. In step 505, the routine displays the message received from the remote participant. In step 506, if the message indicates a termination condition (e.g., "bye"), then the routine continues at step 507, else the routine loops to step 501b to receive the next message. In step 507, the routine removes the communications window and returns.

Figure 6:
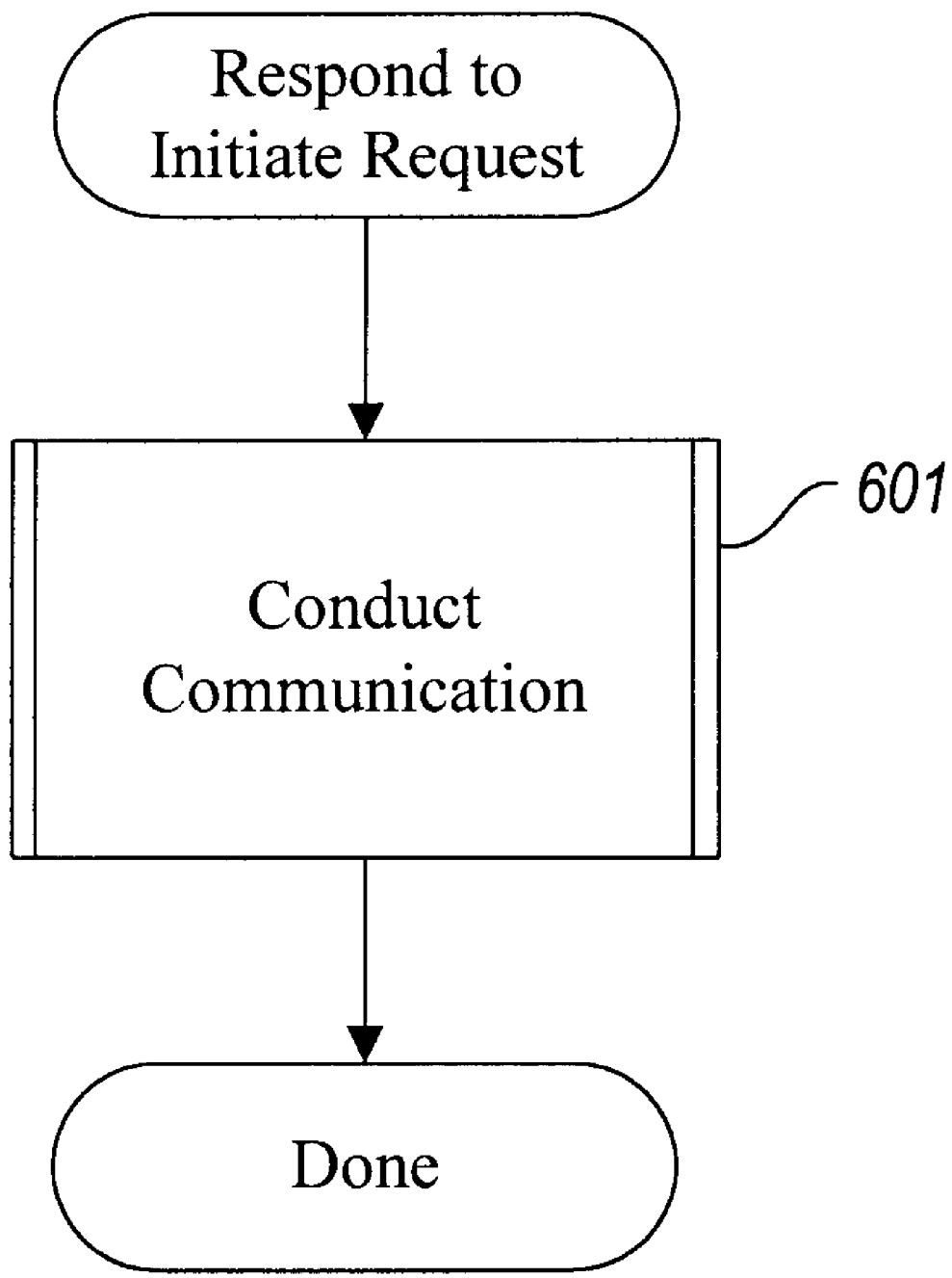
FIG. 6 is an exemplary flow diagram of a routine to respond to an initiate request.

FIG. 6 is an exemplary flow diagram of a routine to respond to an initiate request. When the communications system receives a request to communicate, it transfers control to the PIC component to process the request. In step 601, the procedure invokes the routine to conduct the communication and then returns when the communications has terminated.

Although the present invention has been described in terms of various embodiments, it is not intended that the invention be limited to these embodiments. Modification within the spirit of the invention will be apparent to those skilled in the art. For example, the PIC component can be used in conjunction with other productivity tracking components such as the one described in U.S. application Ser. No. 08/956,180, entitled "Method and System for Tracking Employee Productivity Via Electronic Mail," filed on Oct. 22, 1997, which is hereby incorporated by reference. The scope of the present invention is defined by the claims that follow.

I claim:

1. A method in a networked computer system for facilitating communication between technical support specialists in a call center environment, the computer system having a first computer and a second computer, each computer system having an internet protocol address, the method comprising:

displaying on a first display device a form for tracking time of a first technical support specialist and a communications selector;

in response to selection of the communications selector receiving identification of a second technical support specialist; and sending to the internet protocol address of the second computer a request to communicate with the first technical support specialist;

displaying on a second display device a form for tracking time of a second technical support specialists;

receiving the request sent by the first computer system;

displaying on the second display device a communications window containing information that the first technical support specialist has requested to communicate with the second technical support specialist;

receiving an approval from the second technical support specialist to communicate with the first technical support specialist; and sending a notification of the received approval to the internet protocol address of the first computer whereby the first technical support specialist communicates with the second technical support specialist by inputting a message to the first computer which is sent for display on the second display device and whereby the second technical support specialist communicates with first technical support specialist by inputting a message to the second computer which is sent for display on the first display device and whereby productivity information is entered using the displayed forms.

2. The method of claim 1 wherein the communications selector is an icon.

3. The method of claim 1 wherein the receiving of the identification includes displaying the identification of technical support specialists to whom the first technical support specialist can communicate.

4. A method for facilitating communication between representatives in a call center environment using a productivity tracking system, each representative having a computer system, the method comprising:

displaying on a display device of the computer system of a first representative a form for tracking productivity of the first representative and a communications selector;

in response to selection of the communications selector, receiving identification of a second representative;

sending to the computer system of the second representative a request to communicate with the first representative;

receiving approval from the second representative to communicate with the first representative;

receiving a communication from the first representative;

sending the communication received from the first representative to the second representative;

receiving a communication from the second representative; and displaying on the display device of the computer system of the first representative the communication received from the second representative.

5. The method of claim 4 wherein the computer systems are connected via a local area network, wherein each computer system has an internet protocol address, and wherein the sending of the communication includes sending of the internet protocol address of the computer system of the second representative.

6. The method of claim 4 wherein the form for tracking time is part of a client/server productivity tracking system.

7. The method of claim 4 wherein the form for tracking time is part of an electronic mail message based productivity tracking system.

8. The method of claim 4 including displaying a communications window after receiving the identification of the second representative and displaying communications received from the second representative in the displayed communications window.

9. The method of claim 4 including displaying a communications window after receiving the identification of the second representative is received and when the communication from the second representative indicates that communications is disapproved, removing the displayed communications window.

10. A method for facilitating communication between representatives in a call center environment, each representative having a computer system, the method comprising:

displaying on a display device of the computer system of a first representative a form for receiving time information of the first representative;

receiving through the displayed form time information of the first representative;

receiving a request from a second representative to communicate with the first representative;

suspending the receiving of the time information and displaying on the display device of the first representative a communications window indicating that the request has been received;

receiving a communication from the first representative;

sending the communication received from the first representative to the second representative;

receiving a communication from the second representative; and displaying within the displayed communications window the communication received from the second representative.

11. The method of claim 10 wherein the computer systems are connected via a local area network, wherein each computer system has an internet protocol address, and wherein the sending of the communication includes sending of the internet protocol address of the computer system of the second representative.

12. The method of claim 10 wherein the form for receiving time information is part of a client/server productivity tracking system.

13. The method of claim 10 wherein the form for receiving time information is part of an electronic mail message based productivity tracking system.

14. The method of claim 10 including removing the displayed communications window when the first representative indicates that the communications is terminated.

15. The method of claim 10 including removing the displayed communications window when the received communications from the second representative indicates that the communications is terminated.

16. A communications system for communicating between representatives, each representative having a computer system, comprising:

a productivity tracking component that displays on a display device of the computer system of a first representative a form for tracking productivity of the first representative and a communications selector; and a communications component that includes an establish communications component that after selection of the communications selector, receives an identification of a second representative, displays a communications window, sends to the computer system of the second representative a request to communicate with the first representative, and receives approval from the second representative to communicate with the first representative, and includes a conduct communication component that receives a communication from the first representative, sends the communication received from the first representative to the second representative, receives a communication from the second representative, and displays on the display device of the computer system of the first representative the communication received from the second representative.

17. The system of claim 16 wherein the computer systems are connected via a local area network, wherein each computer system has an internet protocol address, and wherein the sending of the communication includes sending of the internet protocol address of the computer system of the second representative.

18. The system of claim 16 wherein the productivity tracking component is client/server based.

19. The system of claim 16 wherein the productivity tracking component is electronic mail message based.

20. The system of claim 16 wherein the conduct communication component displays a communications window after receiving the identification of the second representative and displaying the communication received from the second representative in the displayed window.

21. The system of claim 16 wherein the conduct communication component displays a communications window after receiving the identification of the second representative is received and when the communication from the second representative indicates that the communication is disapproved, removes the displayed communications window.

22. A computer-readable medium containing instructions which when executed cause a computer system to facilitate communications between representatives, each representative having a computer system, by:

displaying on a display device of the computer system of a first representative a form for receiving time information of the first representative;

receiving through the displayed form time information of the first representative;

receiving a request from a second representative to communicate with the first representative;

suspending the receiving of the time information and displaying on the display device of the first representative a communications window indicating that the request has been received; and conducting a communication between the first and second representatives.

23. The computer-readable medium of claim 22 wherein the computer systems are connected via a local area network, wherein each computer system has an internet protocol address, and wherein the sending of communications includes sending of the internet protocol address of the computer system of the second representative.

24. The computer-readable medium of claim 22 wherein the form for tracking time is part of a client/server productivity tracking system.

25. The computer-readable medium of claim 22 wherein the form for tracking time is part of an electronic mail message based productivity tracking system.

* * * * *